(12) United States Patent
Fleischer et al.

(10) Patent No.: US 8,656,332 B2
(45) Date of Patent: Feb. 18, 2014

(54) AUTOMATED CRITICAL AREA ALLOCATION IN A PHYSICAL SYNTHESIZED HIERARCHICAL DESIGN

(75) Inventors: Bruce M. Fleischer, Bedford Hills, NY (US); David J. Geiger, Peekskill, NY (US); Hung C. Ngo, Austin, TX (US); Ruchir Puri, Baldwin Place, NY (US); Haoxing Ren, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/394,035

(22) Filed: Feb. 26, 2009

(65) Prior Publication Data

US 2010/0218155 A1 Aug. 26, 2010

(51) Int. Cl.
*G06F 17/50* (2006.01)

(52) U.S. Cl.
USPC ........... 716/119; 716/102; 716/105; 716/108; 716/113; 716/116; 716/117; 716/122; 716/124; 716/132; 716/136

(58) Field of Classification Search
USPC ......... 716/102, 105, 108, 113, 116, 117, 119, 716/122, 124, 132, 136
See application file for complete search history.

(56) References Cited

U.S. PATENT DOCUMENTS

| | | | | | |
|---|---|---|---|---|---|
| 4,630,219 | A | * | 12/1986 | DiGiacomo et al. | 716/123 |
| 5,341,309 | A | * | 8/1994 | Kawata | 716/122 |
| 5,521,837 | A | * | 5/1996 | Frankle et al. | 716/113 |
| 5,870,313 | A | * | 2/1999 | Boyle et al. | 716/122 |
| 5,903,461 | A | * | 5/1999 | Rostoker et al. | 700/121 |
| 6,155,725 | A | * | 12/2000 | Scepanovic et al. | 716/122 |
| 6,292,929 | B2 | * | 9/2001 | Scepanovic et al. | 716/118 |
| 6,421,809 | B1 | * | 7/2002 | Wuytack et al. | 716/132 |
| 6,651,225 | B1 | * | 11/2003 | Lin et al. | 716/113 |
| 6,662,349 | B2 | * | 12/2003 | Morgan et al. | 716/114 |
| 6,686,759 | B1 | * | 2/2004 | Swamy | 324/750.15 |
| 7,076,755 | B2 | * | 7/2006 | Ren et al. | 716/123 |
| 7,143,367 | B2 | * | 11/2006 | Eng | 716/102 |
| 7,480,606 | B2 | * | 1/2009 | Tseng et al. | 703/14 |
| 7,617,470 | B1 | * | 11/2009 | Dehon et al. | 716/116 |

(Continued)

OTHER PUBLICATIONS

Huang et al.; "Low-power driven standard-cell placement based on a multilevel force-directed algorithm"; Publication Year: 2004; SOC Conference, 2004. Proceedings. IEEE International; pp. 145-146.*

(Continued)

*Primary Examiner* — Helen Rossoshek
(74) *Attorney, Agent, or Firm* — Garg Law Firm, PLLC; Rakesh Garg; John Flynn

(57) ABSTRACT

A method, computer program product, and data processing system for efficiently performing automated placement of timing-critical unit-level cells in a hierarchical integrated circuit design is disclosed. In preparation for global optimization the entire unit at the cell level, macro-level cells are assigned a "placement force" that serves to limit the movement of the macro-level cells from their current position. Movement boundaries for each macro element are also defined, so as to keep the components in a given macro element in relative proximity to each other. Optimization/placement of the unit design is then performed, via a force-directed layout algorithm, on a "flattened" model of the design while respecting the movement boundaries. Following this "flattened" optimization, the placed "unit-level" cells are modeled as blockages and the macro elements are optimized individually, while respecting the location(s) of the blockages. This entire process is repeated until the optimization of the unit layout eventually converges.

20 Claims, 9 Drawing Sheets

(56) References Cited

U.S. PATENT DOCUMENTS

| | | | |
|---|---|---|---|
| 7,685,545 B2* | 3/2010 | Chapman et al. | 716/136 |
| 7,694,256 B1* | 4/2010 | Galloway et al. | 716/124 |
| 7,703,059 B2* | 4/2010 | Murray et al. | 716/124 |
| 7,793,254 B2* | 9/2010 | Eichenseer et al. | 716/130 |
| 7,882,463 B2* | 2/2011 | Heng et al. | 716/103 |
| 7,882,475 B2* | 2/2011 | Alpert et al. | 716/119 |
| 7,921,393 B2* | 4/2011 | Furnish et al. | 716/110 |
| 8,271,920 B2* | 9/2012 | Cho et al. | 716/110 |
| 2005/0204321 A1* | 9/2005 | Izurieta | 716/4 |
| 2006/0053396 A1* | 3/2006 | Eng | 716/7 |
| 2009/0031277 A1* | 1/2009 | McElvain et al. | 716/18 |
| 2009/0219051 A1* | 9/2009 | Zhang et al. | 326/38 |
| 2009/0241081 A1* | 9/2009 | Smith et al. | 716/6 |
| 2010/0023910 A1* | 1/2010 | Chen et al. | 716/10 |
| 2010/0199234 A1* | 8/2010 | Adya et al. | 716/2 |

OTHER PUBLICATIONS

Bo Hu et al.; "Multilevel fixed-point-addition-based VLSI placement"; Publication Year: 2005; Computer-Aided Design of Integrated Circuits and Systems, IEEE Transactions on; vol. 24, Issue: 8; pp. 1188-1203.*

Vorwerk et al.; "An improved multi-level framework for force-directed placement"; Publication Year: 2005; Design, Automation and Test in Europe, 2005. Proceedings; pp. 902-907 vol. 2.*

Alupoaei et al.; "Net-based force-directed macrocell placement for wirelength optimization"; Publication Year: 2002; Very Large Scale Integration (VLSI) Systems, IEEE Transactions on; vol. 10, Issue: 6; pp. 824-835.*

* cited by examiner

AUTOMATED CRITICAL AREA ALLOCATION IN A PHYSICAL SYNTHESIZED HIERARCHICAL DESIGN

GOVERNMENT FUNDING STATEMENT

This invention was made with Government support under DARPA, B554331. THE GOVERNMENT HAS CERTAIN RIGHTS IN THIS INVENTION.

BACKGROUND OF THE INVENTION

1. Technical Field

The present invention relates generally to computer-aided design of very-large-scale integrated circuits (VLSI). More specifically, the present invention provides a method of performing automated component placement in a hierarchically-defined semiconductor design.

2. Description of the Related Art

As integrated circuits increase in complexity and functionality, it becomes increasingly useful to adopt a hierarchical approach to their design. By "hierarchical" it is meant that the unit-level design (i.e., the design of the entire circuit—the "unit"—as a whole) is divided into smaller-scale "macro elements," which are themselves composed of smaller, lower-level components or "cells" (which, themselves, may be comprised of even smaller, lower-level components). Hierarchical design aids in the organization of the design process and also helps to avoid unnecessary duplication of work, since a typical circuit design will likely contain multiple copies of a single macro element and will usually contain multiple copies of a single cell.

FIG. 1 provides an example of such a hierarchical design. Unit 100 is contains a plurality of macro elements 102, 104, and 106, each of which functions more or less like a "black box" for purposes of unit-level design/analysis. Each of these macro elements is itself composed of multiple cells, such as cell 107. We call cell 107 a "macro-level" cell, because it is a cell that makes up part of the design for a macro element. Macro elements 102, 104, and 106 function together as a unit by virtue of their connections to each other via their respective I/O (input/output) "pins," which represent the "black box" input and output terminals of each macro element. For instance, in FIG. 1, macro elements 102 and 106 are connected to each other via their respective I/O pins 112 and 114, interconnection path 108, and "unit-level" cell 110, which serves as an interface (e.g., "glue logic," in a digital circuit context) between the two macro elements. We call cell 110 a "unit-level" cell because it is not part of the "block box" design of any of the macro elements—it exists at the "unit level" but not at the "macro level."

The basic design process in a hierarchical design, therefore, is to first design the individual macro elements (or pull them from a library of existing designs), then assemble those individually designed and tested "black boxes" into the completed design, adding any necessary interface circuitry in the form of "unit-level" cells. While this approach provides considerable benefits to the designer, a pure black-box approach may come with the cost of decreased timing efficiency of the finished design. The example provided in FIG. 1 illustrates why this may the case. If macro element 104 is treated like a true "black box," unit-level cell 110 must reside outside of the boundaries of macro element 104, thus requiring interconnection path 108 to wind itself around macro element 104 to avoid the obstacle macro element 104 presents. This longer interconnection path introduces a certain amount of delay into the signal(s) running between macro element 102 and 106. In the best case, this added delay will merely degrade performance somewhat. However, in a timing-critical portion of a design, such a delay may prevent the design from working at all. Such a delay might be addressed by abandoning the black-box model and addressing the placement problem at a global, unit-level, but this approach also implies abandoning the many conveniences of the hierarchical design paradigm. Additionally, such global optimization can be computationally quite expensive.

What is needed, therefore, is a method of addressing critical timing issues in the context of unit-level placement/layout in a hierarchical design. The present invention provides a solution to this and other problems, and offers other advantages over previous solutions.

SUMMARY OF THE INVENTION

Accordingly, the present invention provides a method, computer program product, and data processing system for efficiently performing automated placement of timing-critical unit-level cells in a hierarchical integrated circuit design. In preparation for global optimization the entire unit at the cell level, macro-level cells are assigned a "placement force" (in the sense of force-directed layout) that serves to limit the movement of the macro-level cells from their current position. Movement boundaries for each macro element are also defined, so as to keep the components in a given macro element in relative proximity to each other. Optimization/placement of the unit design (including macro-level cells in addition to true "unit-level" cells) is then performed, via a force-directed layout algorithm, on a "flattened" model of the design while respecting the movement boundaries. Following this "flattened" optimization, the placed "unit-level" cells are modeled as blockages and the macro elements are each optimized individually, while still respecting the location(s) of the blockages. This process thus enables unit-level cells to be embedded within "free space" of macro elements to allow for more optimal timing (and more efficient use of layout space). This entire process is repeated until the optimization of the unit layout eventually converges.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
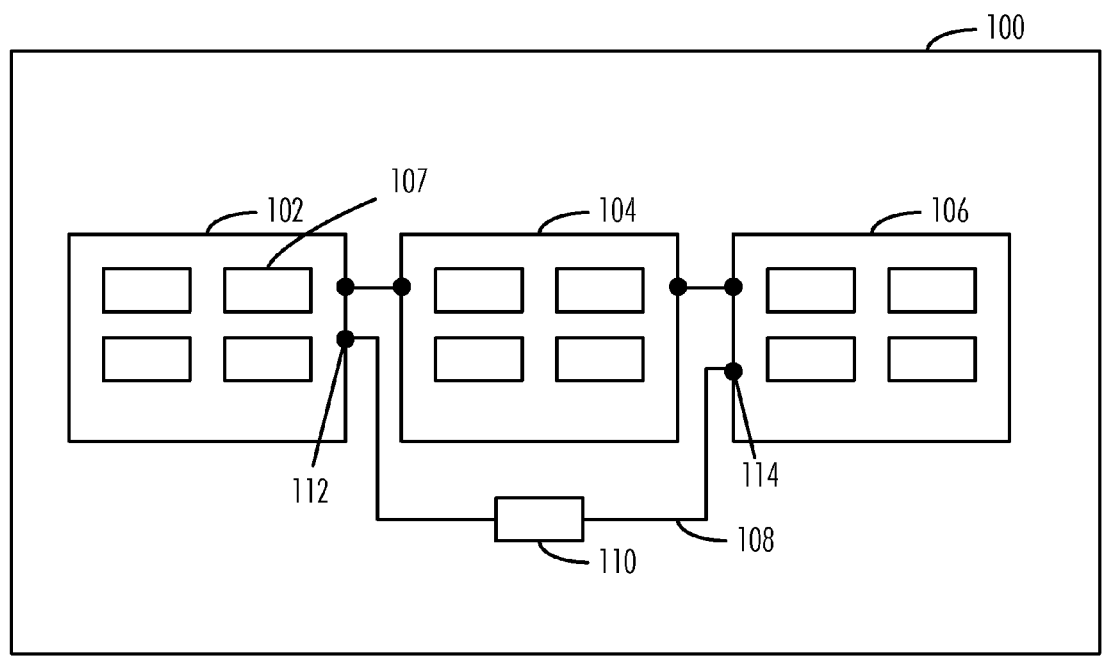
FIG. 1 is a diagram of a hierarchical integrated circuit design.
Figure 2:
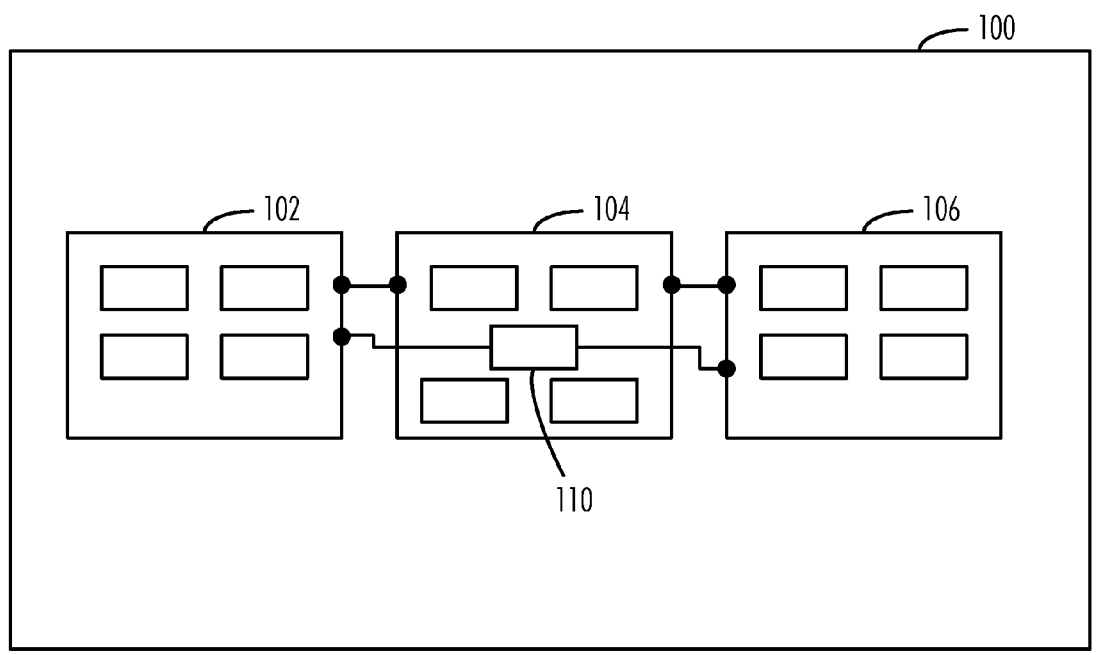
FIG. 2 is a diagram of a hierarchical integrated circuit design in which the placement/optimization method of a preferred embodiment of the present invention has been applied.

As indicated above, a preferred embodiment of the present invention performs automated placement of circuit components in a VLSI design in such a way as to permit unit-level cells to reside within "free space" of macro elements within a hierarchical design while retaining the hierarchical character of the design. An example application of this technique is illustrated in FIG. 2, which represents a modified version of the design shown in FIG. 1. In FIG. 2, macro element 104 is internally modified slightly (by displacing its internal "macro-level" cells) to allow unit-level cell 110 to be placed within its boundaries, thus allowing macro elements 102 and 106 to be connected through unit-level cell 110 in a more timing-efficient and space-efficient manner.

Figure 3:
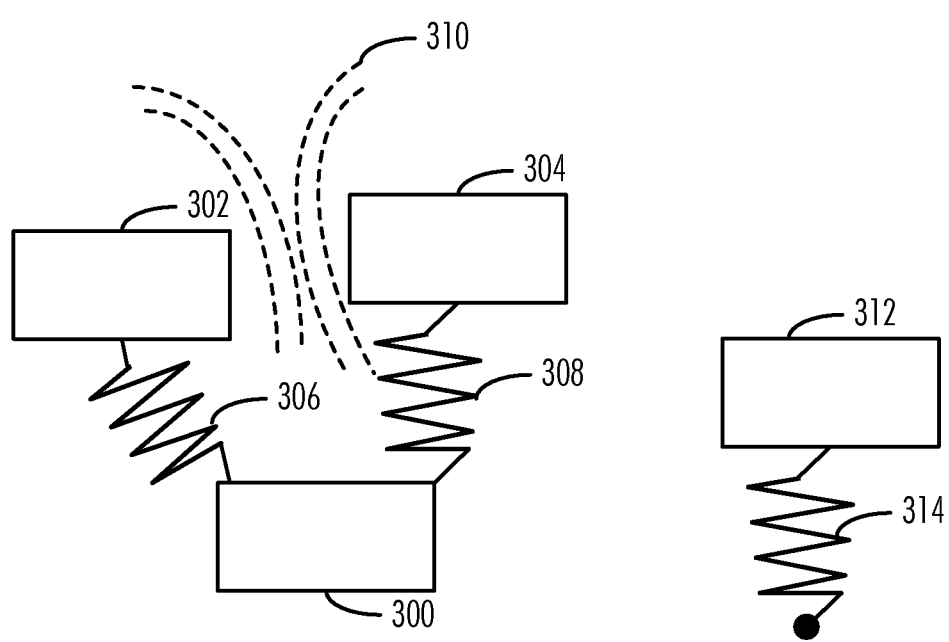
FIG. 3 is a diagram illustrating principles of operation behind force-directed placement.

The placement technique utilized in a preferred embodiment of the present invention is a variant form of force-directed placement. FIG. 3 is a diagram illustrating principles of operation behind force-directed placement. In a typical force-directed placement algorithm, the cells to be placed (e.g., cells 300, 302, 304, and 312 in FIG. 3) are modeled as masses in a physical system. Some sort of restraining force is applied between cells that are to be connected in the circuit to keep these cells in relative proximity to each other. For example, in the model provided in FIG. 3 springs 306 and 308 are used to model this restraining force (which, according to Hooke's law, would be directly proportional to the length to which the spring is stretched—the proportionality constant defines the strength of the spring). Similarly, instead of a spring, some form of attractive force (which may be modeled as the electrostatic force between two charged particles of opposite polarity) could be used. To restrict a particular cell's movement away from a given absolute position, a "placement force" may be applied, as shown here with cell 312, which is restrained in its movement by spring 314.

In addition to this restraining force, a repulsive force (which might be modeled similarly to the repulsion between two charged particles of the same polarity as being inversely proportional to the square of the distance between the particles) is also modeled (as indicated by dashed lines 310). This repulsive force prevents cells from clumping too close together or (worse still) overlapping.

As in the physical case, the entire system of forces, acting in concert, will cause motion to be induced in the cells until at some point the system reaches a state of (relative) equilibrium where little or no movement is present, at which the force-directed placement algorithm terminates. In a preferred embodiment of the present invention, a force-directed placement algorithm is used to place cells in positions relative to each other (as with cells 300, 302, and 304 in FIG. 3) as well as to restrict movement of certain cells away from specified locations (as with cell 312 in FIG. 3).

Figure 4:
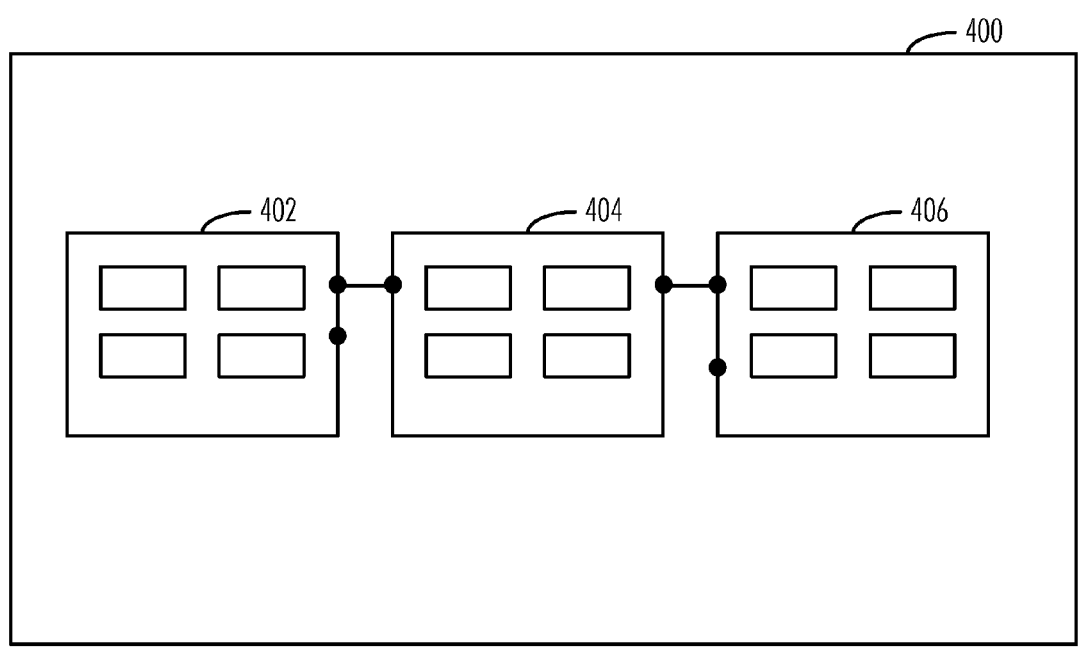
FIG. 4 is a diagram of a hierarchical integrated circuit design to which unit-level cells are to be added in accordance with a preferred embodiment of the present invention.

An example application of a preferred embodiment of the present invention is illustrated in FIGS. 4-7. FIG. 4 is a diagram of a hierarchical integrated circuit design to which unit-level cells are to be added and placement optimized in accordance with a preferred embodiment of the present invention. Unit 400 in FIG. 4 comprises three macro elements 402, 404, and 406, the layout of each of which has been optimized individually for that macro element. It is desired to place an additional unit-level element that will be used to interface macro elements 402 and 406 together. The most direct path to connect interface macro elements 402 and 406 together must go through macro element 404, however.

Figure 5:
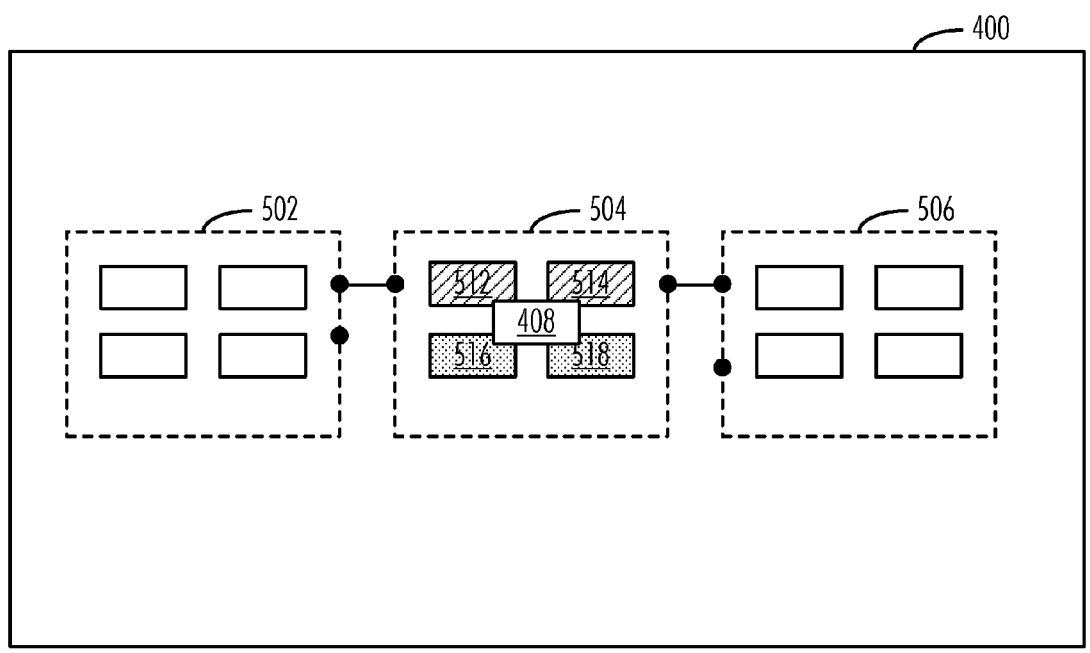
FIG. 5 is a diagram illustrating the initial placement of a unit-level cell and assignment of placement forces to macro-level cells within the design of FIG. 4 in accordance with a preferred embodiment of the present invention.

A preferred embodiment of the present invention makes such direct routing possible by allowing minor positional adjustments to be made to the macro-level cells within a macro element to accommodate user-level cells within the layout space of the macro element. Preliminary steps employed by this preferred embodiment are illustrated in FIG. 5. Movement boundaries or "movebounds" (502, 504, and 506) are defined for each of the macro elements. These movement boundaries set forth limits for the movement of macro-level cells within each macro element (so that macro-level cells from the same macro stay in proximity to each other). To avoid the creation of awkward gaps in the resulting layout, these movement boundaries are preferably defined such that there is a minimum density of cells within the boundaries. In addition to the definition of movebounds for each macro element, each macro-level cell is assigned a placement force to keep its movement at this stage limited (since it is assumed at this point that the macro elements themselves have individually-optimized layouts and rapid convergence of this stage of optimization is desired). The strength of the placement force applied will vary according to the timing-criticality of a given cell. For example, in FIG. 5, macro-level cells 512 and 514 are considered to be timing-critical in their placement and are thus given a higher placement force than cells 516 and 518 (denoted by a difference in shading in the diagram) Finally, the unit-level cell to be added (cell 408) is placed in the layout for unit 400.

Figure 6:
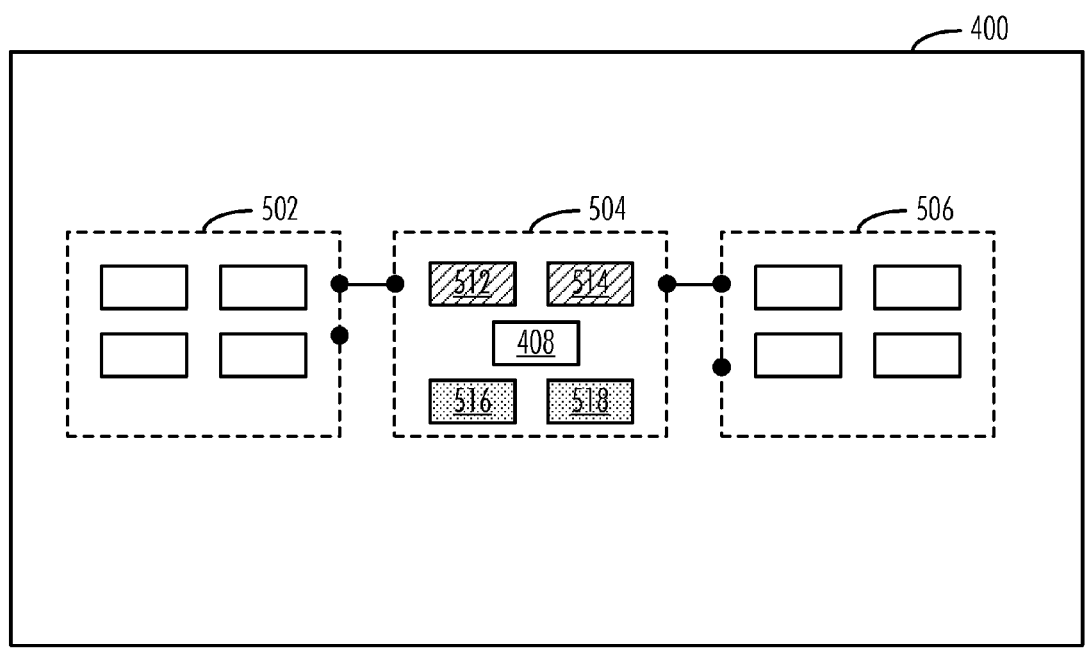
FIG. 6 is a diagram illustrating a result of initial "flattened" optimization in accordance with a preferred embodiment of the present invention.

A force-directed placement algorithm is then applied to the "flattened" design in FIG. 5, meaning that apart from recognizing that macro-level cells are not permitted to leave their respective movebounds, placement for the entire unit is, at this stage, determined globally at the cell level, without regard for the existence of macro elements. The result of applying this algorithm is depicted in FIG. 6, where it can be seen that cells 516 and 518 (the macro-level cells with the smallest positioning force) have been displaced from their original locations to accommodate unit-level cell 408 (while cells 512 and 514 have remained in virtually the same position they were previously, due to their much higher placement forces).

Figure 7:
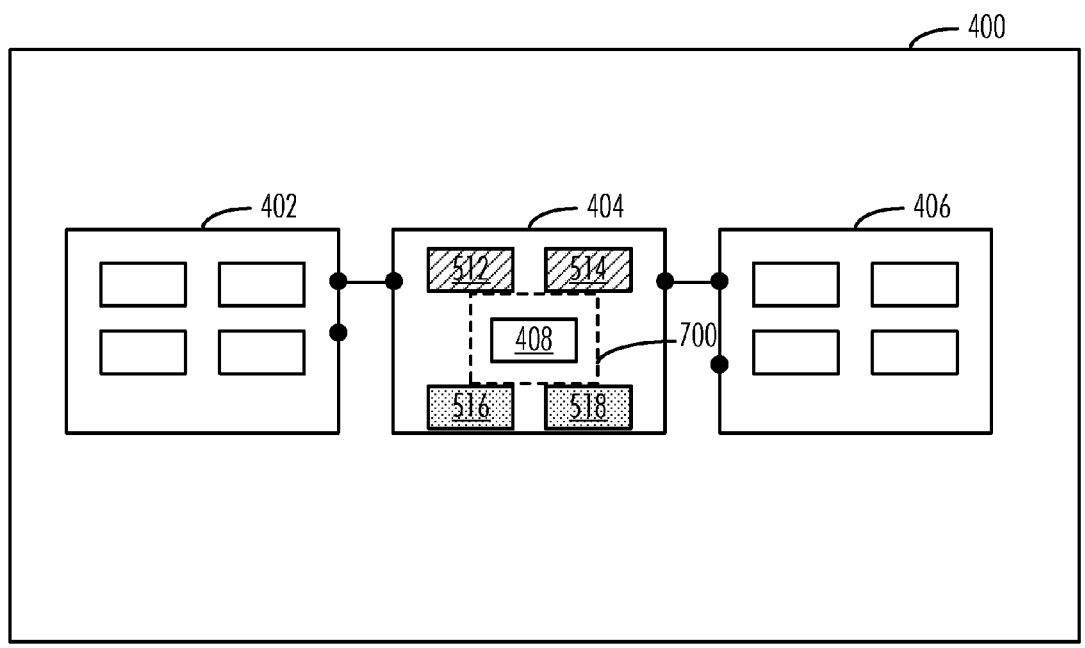
FIG. 7 is a diagram illustrating a result of modeling unit-level cells as blockages and performing subsequent optimization on individual macro elements in accordance with a preferred embodiment of the present invention.

At this point, the now-placed unit-level cell 408 is now modeled as a blockage 700 at the (shown as a dashed line in FIG. 7). Blockages are at least as large as the unit-level cells they correspond to (in the case of blockage 700, it is actually somewhat larger than cell 408). Local, macro-level placement optimization (i.e., ignoring forces originating from outside of a given macro element) is now performed on macro element 404, thus resulting in minor adjustments for cells 512, 514, 516, and 518 that respect the boundary of blockage 700. Blockages (such as blockage 700) may be modeled as fixed-location blockages or as semi-moveable blockages through the use of placement forces on the blockages. Additionally, to avoid excessive fragmentation of the design (the so-called "Swiss cheese problem"), adjacent blockages may be consolidated and attractive forces may be applied between blockages to encourage such consolidation. At this point, the process of global, then local, optimization would repeat until the computation reaches a fixpoint—i.e., the overall result of the process converges (so that subsequent repeats of the process produce little or no change in the design).

Figure 8:
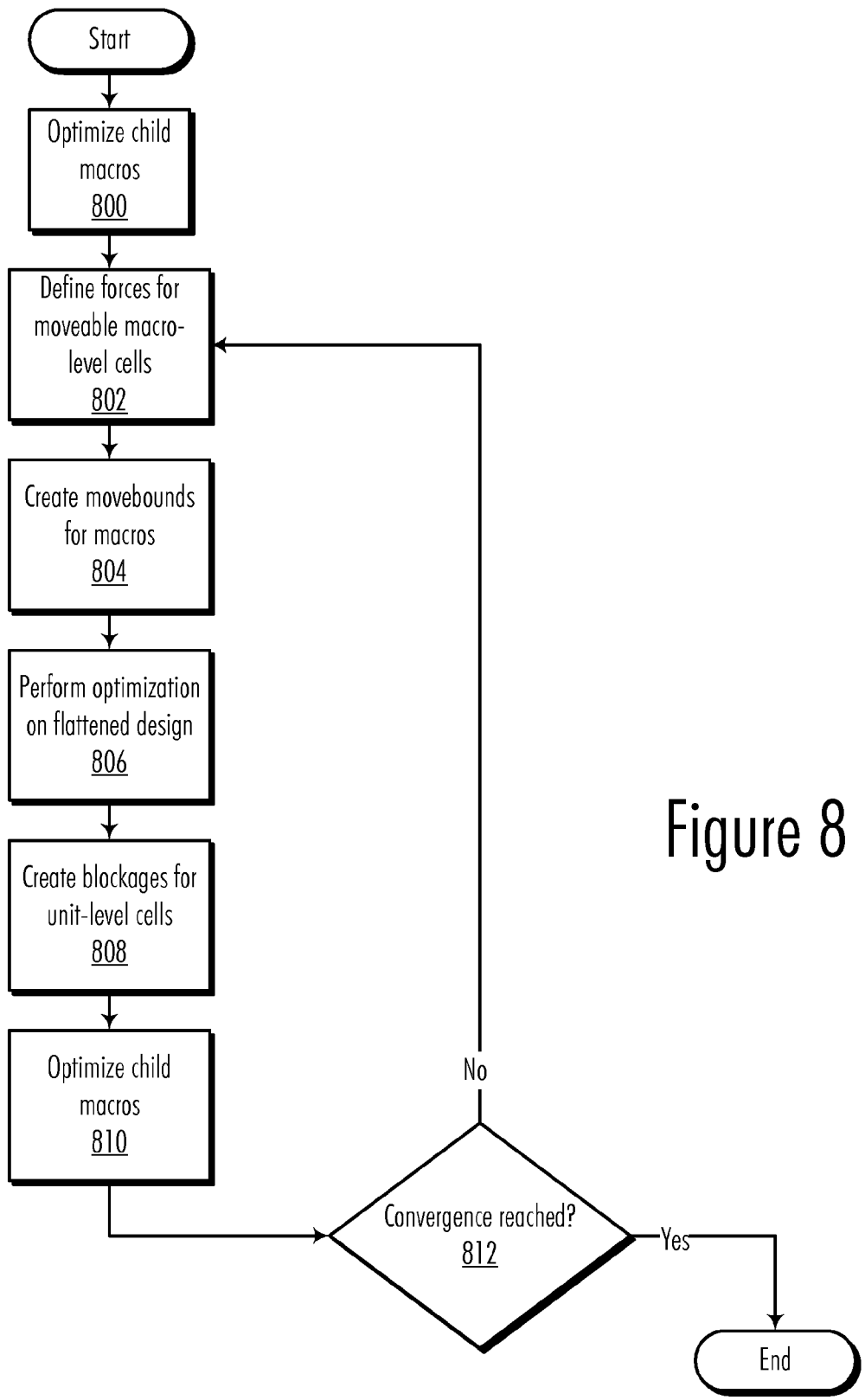
FIG. 8 is a flowchart representation of a process of performing automated placement in accordance with a preferred embodiment of the present invention.

FIG. 8 summarizes the entire process in flowchart form. At the beginning of the process the individual macro elements (i.e., the "child macros" of the overall parent design) are individually optimized (block 800). Placement forces to limit motion are assigned to macro-level cells that will be permitted to move (non-moveable macro-level cells can be modeled as permanently fixed or has having an "infinite" placement force) (block 802). Movebounds, which provide absolute limits on macro-level cell movement are defined for each macro element (block 804). The "flattened" design (in which the entire design, including unit-level and macro-level cells, is considered globally at the cell level) is then optimized using a force-directed placement algorithm (block 806). Unit-level cells so placed are now modeled with blockages (fixed or semi-moveable) at the (block 808). The individual macro elements are then re-optimized individually, but also respecting the newly-placed blockages (block 810). If, after this step, it is determined that the process has converged to a solution (block 812:Yes), then the process terminates. Otherwise (block 812:No) the process repeats by returning to block 802 to define macro-level placement forces.

Figure 9:
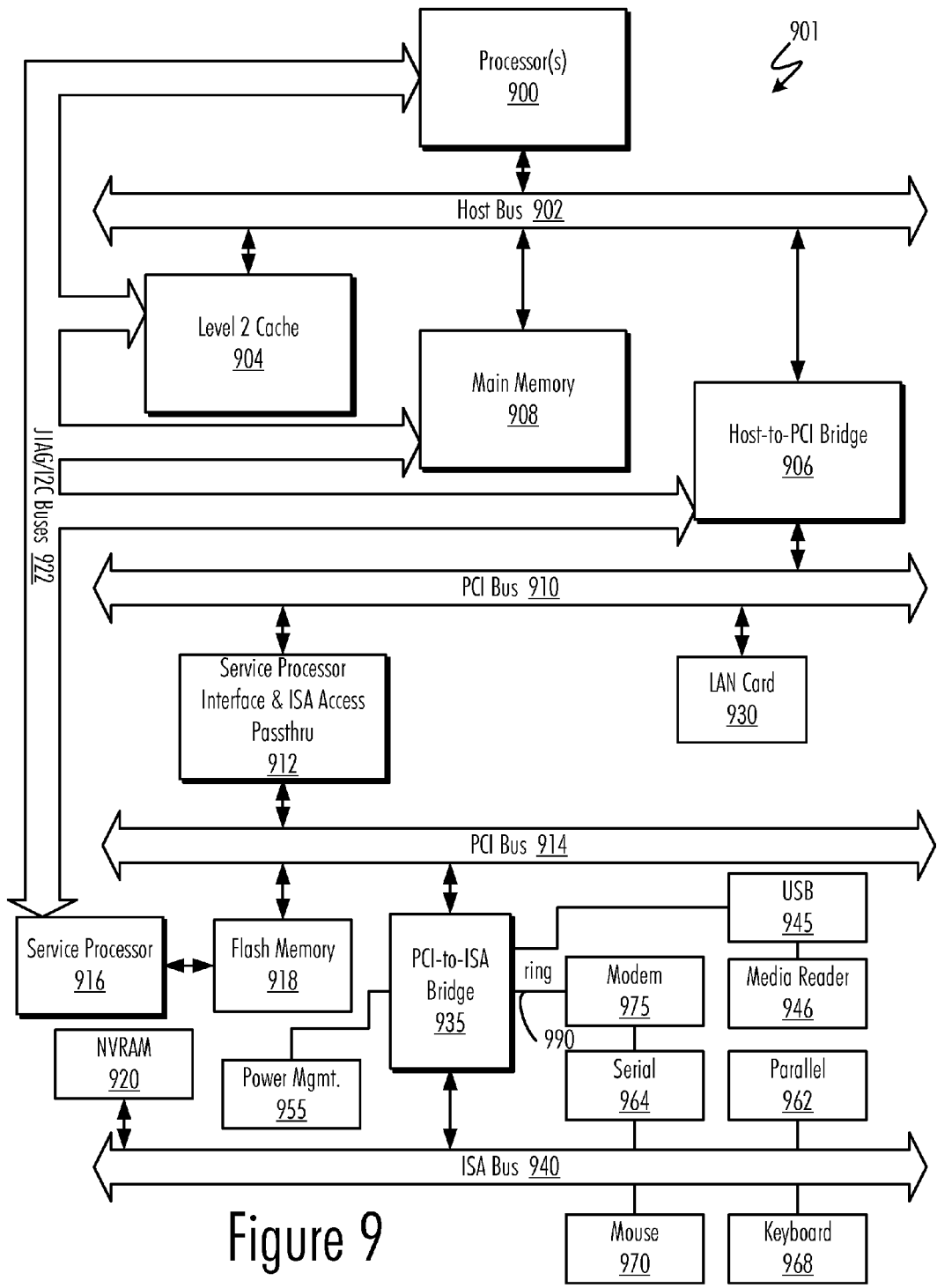
FIG. 9 is a diagram of a data processing system in which the processes of the present invention may be implemented.

FIG. 9 illustrates information handling system 901 which is a simplified example of a computer system/data processing system capable of performing the computing operations described herein with respect to a preferred embodiment of the present invention. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C buses 922 for communication with processor(s) 900 during initialization steps. JTAG/I2C buses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. USB hub 945, for instance, is shown connected to a media reader 946 for the purpose of reading machine-readable tangible data storage media, such as memory cards, optical discs, and the like. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is a computer program, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-performed method comprising:
assigning, using a processor and a memory, placement forces to a set of moveable cells within a macro element of a semiconductor design, the semiconductor design usable to produce a semiconductor circuit, wherein the semiconductor design contains a plurality of macro elements and wherein the placement forces serves to limit movement of said set of moveable cells away from their present location in a force-directed placement algorithm;
placing a new cell in the macro element in the semiconductor design;
applying the force-directed placement algorithm to both the new cell and the set of moveable cells to improve placements of the new cell and the set of moveable cells, resulting in the new cell occupying a location within the macro element by displacing a moveable cell in the set of moveable cells that occupied a portion of the location before applying the force-directed placement algorithm;
placing a blockage at the location of the new cell, the blockage being a blockage located within the macro element;
optimizing placement of the set of moveable cells so as to avoid overlap between the set of moveable cells and the blockage, resulting in optimized placement, the blockage allowing optimization of the placement using a size for the new cell greater than an actual size of the new cell; and
generating a transformed semiconductor design using the optimized placement.

2. The method of claim 1, wherein said optimizing placement of the set of moveable cells is performed via the force-directed placement algorithm, and ignoring forces originating outside the macro element.

3. The method of claim 1, further comprising:
defining a movement boundary for the macro element, wherein the set of moveable cells belonging to that macro element cannot be moved outside of the movement boundary.

4. The method of claim 3, wherein the movement boundary is defined such that a minimum density of cells within the movement boundary is maintained.

5. The method of claim 1, further comprising:
consolidating a plurality of blockages to form the blockage.

6. The method of claim 1, further comprising:
assigning additional placement forces to the blockage for the purpose of performing said optimizing of the set of moveable cells.

7. The method of claim 1, wherein the placement forces are assigned according to timing criticality, such that a moveable cell in the set of moveable cells that is within a critical timing path is less likely to move during force-directed placement as compared to another moveable cell in the set of moveable cells that is not within the critical timing path.

8. A computer program product in a computer-readable storage device including executable code, wherein the executable code, when executed by a computer, directs the computer to perform actions of:

assigning placement forces to a set of moveable cells within a macro element of a semiconductor design, the semiconductor design usable to produce a semiconductor circuit, wherein the semiconductor design contains a plurality of macro elements and wherein the placement forces serves to limit movement of said set of moveable cells away from their present location in a force-directed placement algorithm;
placing a new cell in the macro element in the semiconductor design;
applying the force-directed placement algorithm to both the new cell and the set of moveable cells to improve placements of the new cell and the set of moveable cells, resulting in the new cell occupying a location within the macro element by displacing a moveable cell in the set of moveable cells that occupied a portion of the location before applying the force-directed placement algorithm;
placing a macro-level blockage at the location of the new cell, the blockage being a blockage located within the macro element;
optimizing placement of the set of moveable cells so as to avoid overlap between the set of moveable cells and the blockage, resulting in optimized placement, the blockage allowing optimization of the placement using a size for the new cell greater than an actual size of the new cell; and
generating a transformed semiconductor design using the optimized placement.

9. The computer program product of claim 8, wherein said optimizing placement of the set of moveable cells is performed via the force-directed placement algorithm, and ignoring forces originating outside the macro element.

10. The computer program product of claim 8, further comprising:
defining a movement boundary for the macro element, wherein the set of moveable cells belonging to that macro element cannot be moved outside of the movement boundary.

11. The computer program product of claim 10, wherein the movement boundary is defined such that a minimum density of cells within the movement boundary is maintained.

12. The computer program product of claim 8, further comprising:
consolidating a plurality of blockages to form the blockage.

13. The computer program product of claim 8, further comprising:
assigning additional placement forces to the blockage for the purpose of performing said optimizing of the set of moveable cells.

14. The computer program product of claim 8, wherein the placement forces are assigned according to timing criticality, such that a moveable cell in the set of moveable cells that is within a critical timing path is less likely to move during force-directed placement as compared to another moveable cell in the set of moveable cells that is not within the critical timing path.

15. A data processing system, comprising:
at least one processor;
a data storage accessible to the at least one processor; and
a set of instructions in the data storage, wherein the at least one processor executes the set of instructions to perform actions of:
assigning placement forces to a set of moveable cells within a macro element of a semiconductor design, the semiconductor design usable to produce a semiconductor circuit, wherein the semiconductor design contains a plurality of macro elements and wherein the placement forces serves to limit movement of said set of moveable cells away from their present location in a force-directed placement algorithm;

placing a new cell in the macro element in the semiconductor design;

applying the force-directed placement algorithm to both the new cell and the set of moveable cells to improve placements of the new cell and the set of moveable cells, resulting in the new cell occupying a location within the macro element by displacing a moveable cell in the set of moveable cells that occupied a portion of the location before applying the force-directed placement algorithm;

placing a blockage at the location of the new cell, the blockage being a blockage located within the macro element;

optimizing placement of the set of moveable cells so as to avoid overlap between the set of moveable cells and the blockage, resulting in optimized placement, the blockage allowing optimization of the placement using a size for the new cell greater than an actual size of the new cell; and generating a transformed semiconductor design using the optimized placement.

16. The data processing system of claim 15, wherein said optimizing placement of the set of moveable cells is performed via the force-directed placement algorithm, and ignoring forces originating outside the macro element.

17. The data processing system of claim 15, wherein the at least on processor executes the set of instructions to perform additional actions of:

defining a movement boundary for the macro element, wherein the set of moveable cells belonging to that macro element cannot be moved outside of the movement boundary.

18. The data processing system of claim 15, wherein the at least on processor executes the set of instructions to perform additional actions of:

consolidating a plurality of blockages to form the blockage.

19. The data processing system of claim 15, wherein the at least on processor executes the set of instructions to perform additional actions of:

assigning additional placement forces to the blockage for the purpose of performing said optimizing of the set of moveable cells.

20. The data processing system of claim 15, wherein the placement forces are assigned according to timing criticality, such that a moveable cell in the set of moveable cells that is within a critical timing path is less likely to move during force-directed placement as compared to another moveable cell in the set of moveable cells that is not within the critical timing path.

* * * * *